Feb. 26, 1946.   T. W. JOHNSON   2,395,553
MARKER
Original Filed Nov. 6, 1940
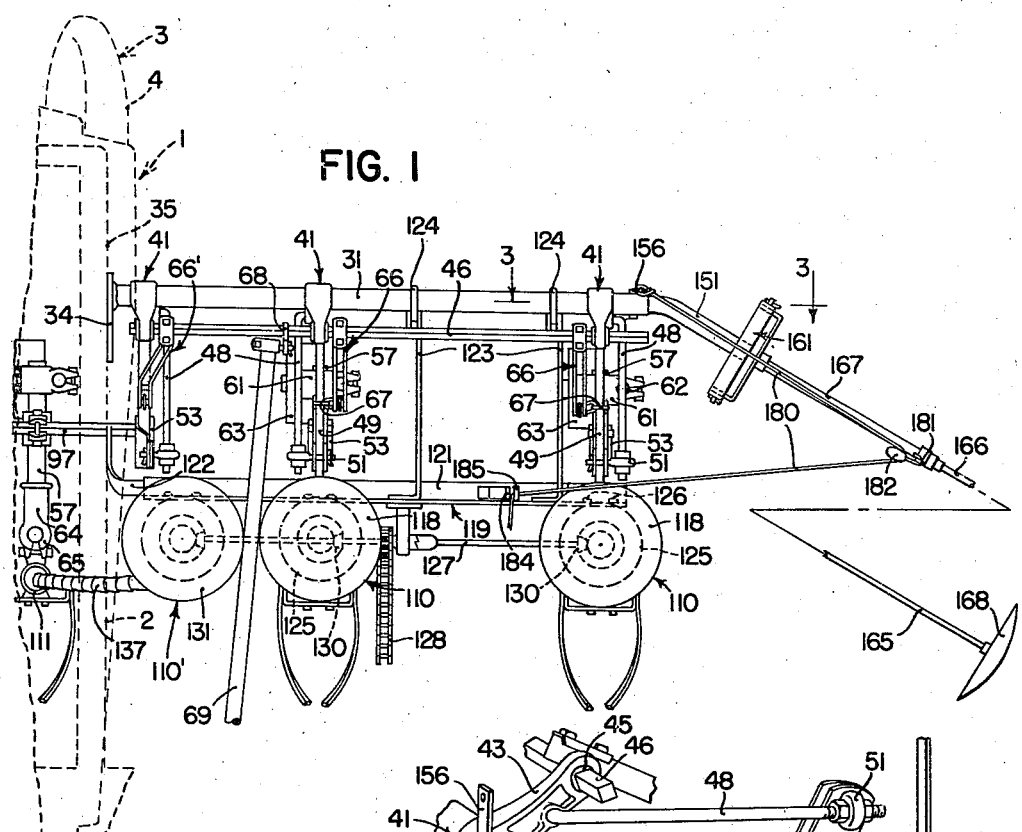
FIG. 1
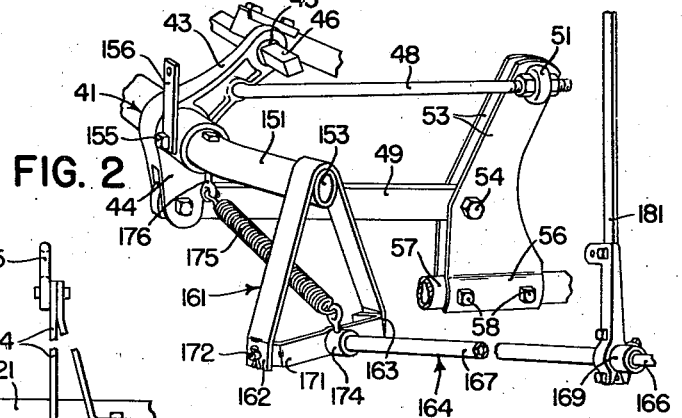
FIG. 2
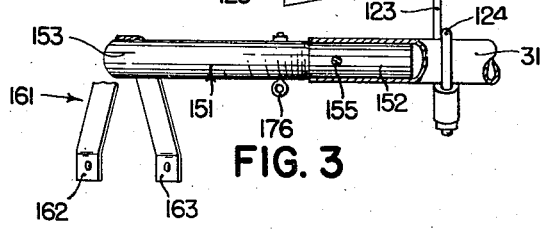
FIG. 3
*INVENTOR.*
THEODORE W. JOHNSON
*ATTORNEYS*

Patented Feb. 26, 1946

2,395,553

UNITED STATES PATENT OFFICE 2,395,553

MARKER

Theodore W. Johnson, Moline, Ill., assignor to Deere & Company, Moline, Ill., a corporation of Illinois Original application November 6, 1940, Serial No. 364,515. Divided and this application June 16, 1943, Serial No. 491,266

10 Claims. (Cl. 97—230)

This application is a division of my co-pending application, Serial No. 364,515, filed November 6, 1940, for Agricultural implement, now United States Patent No. 2,337,662, issued December 28, 1943.

The present invention relates generally to agricultural machines and more particularly to implements for planting and cultivating row crops.

The object and general nature of the present invention is the provision of an agricultural implement that is particularly adapted for power farming and either planting or cultivating a plurality of rows, preferably by the simple expedient of attaching the proper tools according to whether it is desired to plant or to cultivate, using the major portion of the outfit common for both operations. More particularly, it is a feature of the present invention, particularly in connection with a planting implement in which the planting tools are arranged in transverse alignment but are connected for independent floating movement, improved marker means which is especially constructed to accommodate a multi-row tractor propelled outfit, such as a four or five-row machine. It is desirable to have the marker disposed well toward the rear wheels of the tractor, at least far enough rearwardly so as to be substantially in transverse alignment with the planting units with which it is associated. In the present type of machine, wherein each unit is individually and floatingly connected, it is not practical to fix the marker directly to the outermost unit, and especially is this true where multi-row machine, such as a four or five-row machine, is provided, since a marker for such a machine is required to extend laterally a considerable distance and is therefore relatively heavy. Being relatively heavy, the marker cannot be supported adequately on only the outer individual planting unit.

Therefore, according to the present invention, in a machine of this kind I provide means supporting the marker on a rigid part of the implement, such as the draft bar which is forward of the tools and to which the latter are floatingly connected by rearwardly extending links, and so arrange the connection between the marker arm and the draft bar that the marking element is disposed a substantial distance rearwardly of the draft bar, at least far enough to be in transverse alignment with the tools and preferably rearwardly thereof. Specifically, this is conveniently accomplished by providing an extension for the draft bar, which extension is directed outwardly and rearwardly at an angle and supports a pivot yoke that is constructed so that the axis of hinging movement between the marker arm and the hitch support is disposed at such an angle that when in operating position the marker element is disposed well toward the rear of the tractor.

These and other objects and advantages of the present invention will be apparent to those skilled in the art after a consideration of the following detailed description, taken in conjunction with the accompanying drawing illustrating the preferred construction.

In the drawing:

Figure 1 is a plan view of an agricultural machine in which the principles of the present invention have been incorporated, utilizing planting units and arranged to plant five rows;

Figure 2 is a fragmentary perspective view taken from one end of the marker construction employed in the machine shown in Figure 1; and Figure 3 is a sectional view taken generally along the line 3—3 of Figure 1.

Referring now more particularly to Figure 1, the agricultural machine in which the present invention has been incorporated comprises a farm tractor of the three-wheel or tricycle type, indicated generally by the reference numeral 1. The tractor 1 includes a generally longitudinally disposed frame 2, the front end of which is supported on front wheel means 3. The latter may take the form of a pair of closely arranged wheels 4 or a single wheel, or any other suitable supporting means disposed in the center of the tractor. Since the tractor 1 is of conventional construction, the same is illustrated only fragmentarily in Figure 1. For a more complete showing of the tractor and implement, reference may be had to my parent patent mentioned above. The tractor 1 has the usual tractor motor and is also preferably equipped with a power lift mechanism which is connected to raise and lower the tools, as will be referred to below.

The tractor 1 adjacent its forward end carries two laterally outwardly disposed draft bars 31. These draft bars or draft transmitting members are substantially identical except that one is a right-hand part and the other a left-hand part. Each preferably is in the form of a pipe member, and secured, as by welding, to the inner end of each draft bar is an atttaching plate 34 apertured or otherwise formed. By this means the draft bars are bolted, respectively, to the two frame bars 35, which form a part of the tractor frame 2, and extend laterally outwardly therefrom. The draft bars 31 thus provide means by which tools may be connected with the tractor in draft transmitting relation.

The present invention has been illustrated as incorporated in an agricultural machine which is equipped and arranged as a five-row planter. The particular details of the planting units, their arrangement and support, are shown in my parent application, identified above, and hence it will be necessary to describe these parts only briefly here. To provide a five-row machine I prefer to mount the tools so that one is always directly behind the front wheel means, with the others spaced laterally outwardly therefrom but in transverse alignment. This disposes all of the tools in a line across the machine and disposes them between the front and rear wheels where the operator has an excellent view of all operations from the operator's station or seat on the tractor.

Referring first to the planting units, three brackets 41 are carried by each draft bar, the right hand draft bar being indicated at 31. Each bracket 41 has an upper section 43 with a bearing 45, and the rockshaft 46 is carried by the bearings 45. Links 48 and 49 are pivoted to each bracket 43 and at 51 and 54 to a pair of plates 53, the lower ends of which are formed, as at 56, to receive the associated tool bar or rig beam 57, as by bolts 58. Each beam 57 carries a socket casting 61 to which a shank 62 with a gauge wheel 63 is fixed. Each beam 57 carries a tool-receiving fixture 64. Pairs of arms 66 are connected by chains 67 to the links 49. A lifting pipe 69 is pivoted to an arm 68 on the rockshaft 46. The center rig beam 57 is supported on a cross bar 97 carried by the innermost right and left hand rig links 48 and 49. Each planting unit includes a planter furrow opener 111, and outer and inner seed cans 118 and 131 are mounted on a supporting framework 119. The latter includes a bar 121 fixed to a bracket 122 with braces 123 connected at 124 to the draft bar 31.

Each seed can includes suitable seed selecting mechanism and is carried on a supporting base or bracket 125 which is bolted, as at 126, to the angle iron 121. The seed selecting mechanism of the two outer cans 118 at the right side of the tractor is driven by a seeding shaft 127 which is operated by a sprocket chain 128 extending over a driving sprocket fixed to the right axle shaft of the tractor. A seed tube leads downwardly from each seed can 118 to the boot of the associated furrow opener. The seeding shaft 127 drives the seeding mechanism through suitable gearing. The seed drive mechanism and gearing, which are of conventional construction, are indicated in Figure 1 by the reference numeral 130. The left hand seed cans and other parts of the seeding mechanism and driving means therefor at the left side of the tractor are not shown but are substantially the same as the parts just described.

The improved marker means, with which the present invention is more particularly concerned, will now be described. Referring for the moment to Figure 1, it will be noted that each of the planting tools, including the center tool, is floatingly connected with the associated draft bar for movement independent of the other tools and the tractor. Further, the machine being a five-row outfit, the marker for such a machine must necessarily be fairly long and hence of considerable weight, the length of the marker being at least as long as the distance of three row spacings. It is, therefore, not feasible to support the relatively long marker solely on the laterally outer unit, and according to the present invention I provide a marker arm support that is adapted to be fixed to the laterally outer end of each of the draft bars 31 when arranging the machine as a planter. Further, it is desirable to have the ground engaging marker element disposed as far as possible toward the rear of the tractor, and especially is this desirable when the machine comprises a multi-row implement. The farther forward that the marker elements engage the ground, the greater will be the variations in the mark due to the lateral movement of the front end of the tractor which normally occurs when steering the same down the field. These variations become increasingly amplified the greater the length of the marker arm and the number of tools in simultaneous action. Now in order to reduce as far as possible these variations, notwithstanding the attachment of the marker elements to the forwardly disposed draft bars, the present invention contemplates a marker arm construction which is angled laterally outwardly and rearwardly so that objectionable variations in the mark are not present.

Referring more particularly to Figures 2 and 3, a yoke support 151 in the form of a bent pipe having a reduced inner end 152 and a laterally outwardly and rearwardly bent yoke receiving section 153, is disposed in the outer ends of each of the draft bars 31 and 32, the reduced end 151 being inserted in the end of the associated draft bar and fixed therein, as by a bolt 155. This bolt also fixes to the end of the associated draft bar a marker cable anchoring clip 156. A substantially inverted V-shaped yoke 161 is secured, as by welding, to the laterally outer end of the bent yoke support section 153. The yoke 161 terminates in downwardly extending apertured parts 162 and 163 between which the inner end of a marker arm 164 is received. The marker arm 164 comprises three telescopically associated sections 165, 166 and 167, the section 165 supporting a marker element 168, preferably in the form of a disk. The several sections are fixed in extensibly adjusted relation by set screw collar means 169. The innermost end of the inner marker arm section 167 has fixed thereto a U-shaped strap member 171, the ends of which are apertured to receive pivots 172 which support the inner end of the marker arm on the lower end of the yoke 161. A bracket 174 is disposed about the inner end of the inner marker arm section 167 and has an eye portion to which the lower end of a spring 175 is connected. The upper end of the spring 175 is anchored to a bolt 176 fixed to the yoke support pipe 151. The function of the spring 175 is to balance the weight of the marker arm. Both marker arms are of substantially identical construction, and hence a description of one will suffice.

Each marker arm is raised and lowered by a cable 180 which is accessible to the operator on the tractor. The forward end of the cable is anchored to the bracket 156. A strut 181 is fixed to the marker arm in any suitable manner and at its upper end carries a pulley 182 through which the cable 180 is trained. A standard 184 is fixed to the associated seed can supporting angle 121 and at its upper end carries a loop 185 through which the cable 180 extends and which is provided with a slot section into which the cable may be placed, the cable having a knot therein so that when the marker arm is raised the knot may be disposed behind the slotted section and hence hold the marker arm raised.

It will be noted, particularly from Figures 2 and 3, that the yoke support pipe 151 is bent at such an angle that the marker arm 164 extends generally outwardly and backwardly so as to dispose the marker element 168 well toward the rear of the tractor, yet by virtue of the upwardly extending strut 181 and the fact that the forward end of the cable 180 is anchored, as at 156, to a point above and laterally inwardly of the marker arm pivot axis 172, a pull on the cable will raise the marker arm into its raised position. By virtue of pivoting the marker arm directly on the associated draft bar, a firm and rigid support for the marker arm is provided, notwithstanding that for a five-row machine the marker arm is of substantial length and weight, yet by virtue of the fact that the rear or outer end of the marker arm is displaced rearwardly relative to its pivotal support on the draft bar, the marker element is placed in such a position that it accurately marks the ground so that when the outfit is turned around and plants along the marked line, all the rows of seed will be of substantially the same spacing irrespective of slight turning movements of the tractor due to the steering of the same.

While I have shown and described above the preferred structure in which the principles of the present invention have been incorporated, it is to be understood that my invention is not to be limited to the specific details shown and described above, but that, in fact, widely different means may be employed in the practice of the broader aspects of my invention.

What I claim, therefore, and desire to secure by Letters Patent is:

1. In an agricultural implement comprising a transverse draft bar, a marker construction comprising a yoke support adapted to be fixed to said draft bar at the outer end thereof and including a section bent laterally outwardly and rearwardly, a depending marker arm yoke fixed to the outer end of said yoke support, a marker arm pivotally connected with the lower end of said yoke support and extending laterally outwardly and rearwardly when in operating position, a marker element fixed to the outer end of said marker arm, and means reacting against said draft bar for raising said marker arm.

2. In an agricultural implement comprising a transverse draft bar, a marker construction comprising a yoke support fixed to said transverse draft bar, said yoke support including a section bent laterally outwardly and rearwardly, a depending marker arm yoke fixed to the outer end of said yoke support and extending downwardly therefrom, and spaced apart means at the lower end establishing a marker arm pivot axis that extends rearwardly and inwardly relative to the draft bar.

3. The combination with a tractor having a pair of fore and aft spaced apart transverse draft bars fixed thereto, of a marker arm support including a part fixed to the forward draft bar and extending laterally outwardly and rearwardly, a marker arm pivotally connected with the outer end of said part and also extending laterally outwardly and rearwardly, a pulley support carried by said marker arm, a standard fixed to the outer end of the rear bar, and a lifting cable anchored at its forward end to the outer end of said forward draft bar and trained through said pulley and extending inwardly to said standard and thence to a point adjacent the operator's station on the tractor.

4. A marker arm support comprising a bar including angularly related sections, one of said sections being adapted to be attached to a support, and a marker arm pivot yoke comprising a generally V-shaped member having its apex secured to the end of the other of said angularly related sections, the ends of said V-shaped pivot yoke being apertured.

5. A marker arm support as defined in claim 4, further characterized by said bar comprising a member bent intermediate its ends, one section of said member being reduced in diameter to form an attaching section for the marker arm support.

6. The combination of a tool support comprising a pipe member, a marker arm support member comprising a second member insertable into said pipe member, means for securing said members rigidly together, and a marker arm pivot yoke comprising a generally V-shaped member having its apex embracing and secured to the outer end of said second member and depending therefrom, and a marker arm pivotally connected with the lower end of said depending pivot yoke.

7. In an agricultural implement comprising a transverse draft bar, a marker construction comprising a yoke support adapted to be fixed to said draft bar at the outer end thereof and including a section bent laterally outwardly and rearwardly, a depending marker arm yoke fixed to the outer end of said yoke support, a marker arm pivotally connected with the lower end of said yoke support and extending laterally outwardly and rearwardly when in operating position, a marker element fixed to the outer end of said marker arm, and a counterbalancing spring connected at one end with said draft bar and at the other end with said marker arm.

8. In an agricultural implement comprising a transverse draft bar, a marker construction comprising a yoke support fixed to said transverse draft bar and extending generally laterally outwardly therefrom, a depending marker arm yoke fixed to the outer end of said yoke support and extending downwardly therefrom, and spaced apart means at the lower end establishing a marker arm pivot axis that extends rearwardly and inwardly relative to the draft bar.

9. In an agricultural implement comprising a transverse draft bar, a marker construction comprising a yoke support fixed to said transverse draft bar and extending generally laterally outwardly therefrom, a depending marker arm yoke fixed to the outer end of said yoke support and extending downwardly therefrom, spaced apart means at the lower end establishing a marker arm pivot axis that extends rearwardly and inwardly relative to the draft bar, and a counterbalancing means connected between said yoke support and said marker arm and extending between said spaced apart means.

10. In a tractor mounted planter including a transverse draft bar extending laterally outwardly from and carried by said tractor, and a plurality of transversely aligned planting units connected with and extending generally rearwardly from said draft bar, a marker construction comprising a support member including a first section adapted to be rigidly attached to the outer end of said draft bar and a second section extending generally outwardly and rearwardly therefrom, means associated with the outer end of said second section establishing a marker arm hinge axis that extends rearwardly and inwardly with respect to the tractor, a marker arm extending laterally outwardly and rearwardly and including a marking element arranged substantially in transverse alignment with said planting units and hingedly connected with said hinge means for movement about said axis into and out of working position.

THEODORE W. JOHNSON.